(No Model.) 2 Sheets—Sheet 1.

C. J. HUBBELL.
PRIMARY BATTERY.

No. 515,432. Patented Feb. 27, 1894.

WITNESSES
Frank G. Parker
Frank G. Hattie

INVENTOR
Charles J. Hubbell (No Model.) 2 Sheets—Sheet 2.

C. J. HUBBELL.
PRIMARY BATTERY.

No. 515,432. Patented Feb. 27, 1894.

WITNESSES
Frank G. Parker
Frank G. Hattie

INVENTOR
Charles J. Hubbell

UNITED STATES PATENT OFFICE.

CHARLES J. HUBBELL, OF BOSTON, MASSACHUSETTS.

PRIMARY BATTERY.

SPECIFICATION forming part of Letters Patent No. 515,432, dated February 27, 1894.

Application filed May 31, 1893. Serial No. 476,164. (No model.)

*To all whom it may concern:*

Be it known that I, CHARLES J. HUBBELL, of Boston, in the county of Suffolk and State of Massachusetts, have invented a new and useful Improvement in Primary Batteries, of which the following, taken in connection with the accompanying drawings, is a specification.

My invention relates to the construction and arrangement of the several parts of a primary battery, the object being to protect the several parts from exposure, to simplify the connection, to prevent polarization, to absorb all noxious exhalations, and to render the battery convenient and portable. These objects I attain by the mechanism shown in the accompanying drawings, in which—

Figure 2:
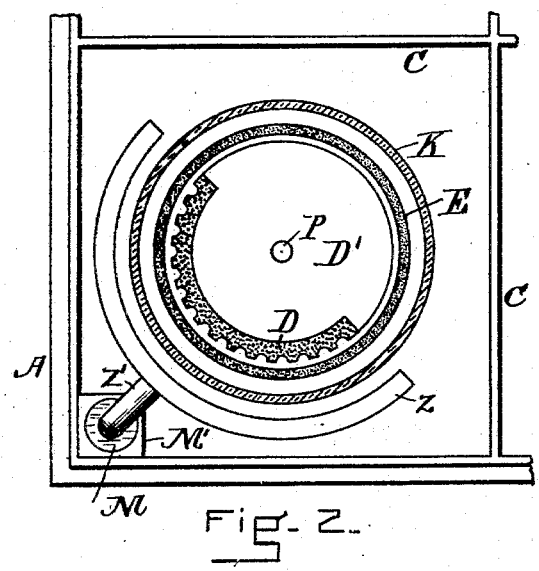
Figure 1:
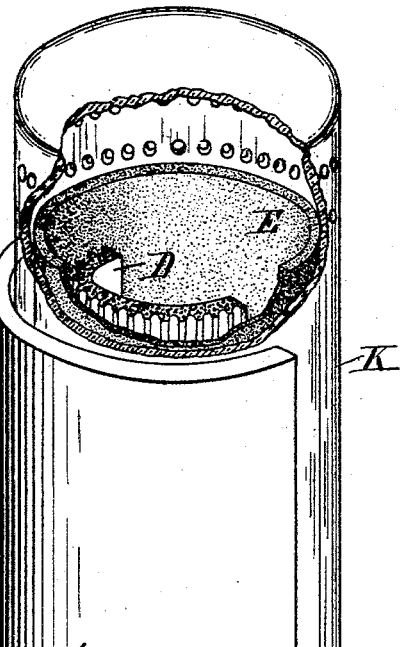
Figure 1:
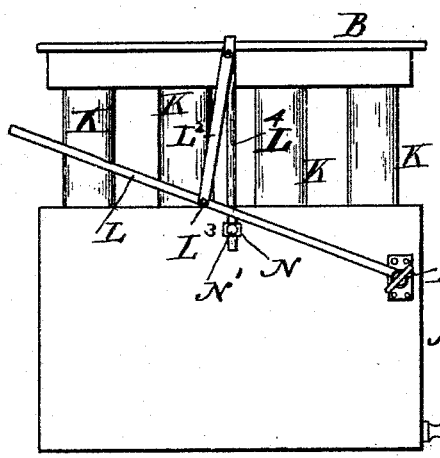
Figure 3:
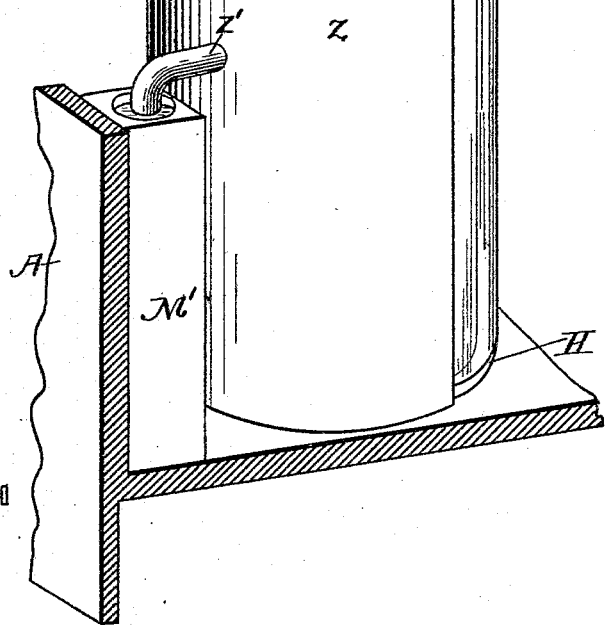
Figure 4:
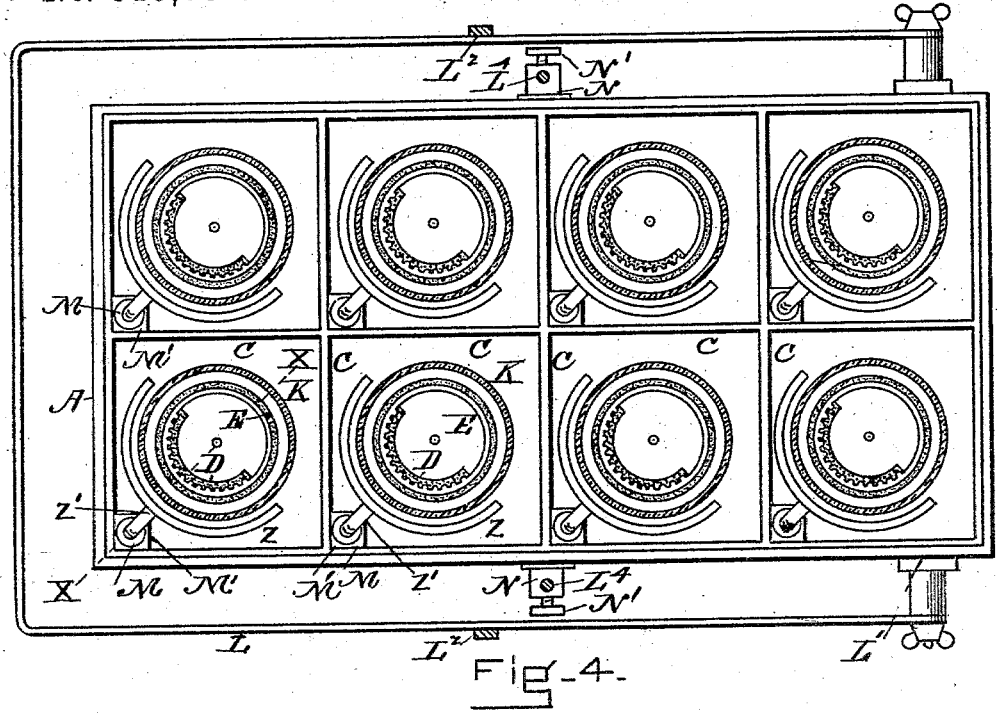
Figure 5:
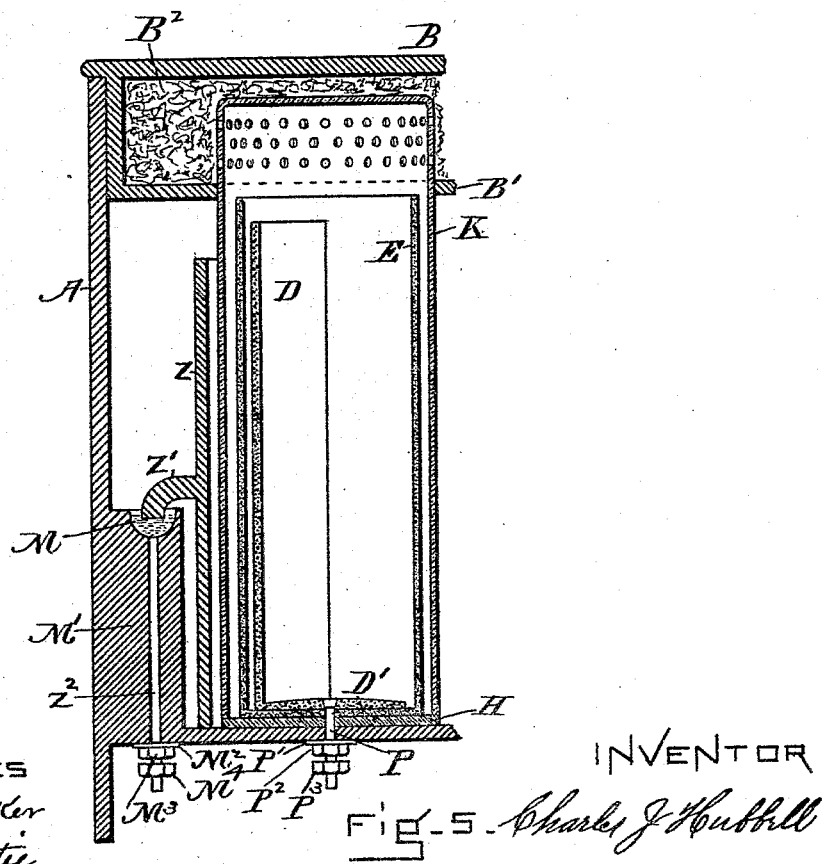

Figure 1 shows, on a small scale, one of my batteries in elevation. Fig. 2 shows in plan a simple cell, of which I have several grouped together to form a battery, as shown in Fig. 4. Fig. 3 shows in perspective the construction and arrangement of the elements as a simple cell; also parts of the casing which forms the outer wall and bottom of the cell. Fig. 4 is a plan of an eight cell battery, the covers being removed. Fig. 5 is a vertical section, taken on line $x-x$ of Fig. 4, showing the arrangement of the elements of a single cell.

A general view, on a small scale, of one of my batteries is shown in Fig. 1, and a plan is shown in Fig. 4. These illustrations indicate a battery of eight cells, although the number of cells is not important, the idea being to have as many as convenient in a single case and still have it portable. The walls of the cells C—C and the case A are made integral and of some suitable material, like papier-maché rendered acid proof, or hard rubber, or some compounds of like nature. In one corner of each cell, mercury cup M is formed, from the substance of which the walls of the cells are made, and is integral with them.

M', Figs. 2, 4, and 5, is an inwardly projecting member of the walls and serves to form the mercury cup M and an insulation for the zinc electrode $Z^2$ (see Fig. 5).

The zinc element is semicircular in horizontal section, as shown in Figs. 2, 3, and 4, and has curved stud Z' projecting from about the center of the element, and so formed as to connect with the mercury in the mercury cup M. By uniting the stud Z' centrally with the zinc element Z, I reduce the resistance of the passage of electrical current, through the zinc, to a minimum. The carbon element D is also semicircular in cross section, and preferably corrugated. The carbon element has a circular disk base D', Figs. 2 and 5, which is molded integral with the part D. The carbon D D' is placed within the porous cup E as shown. The porous cup E is made in the usual manner. The cup E does not rest directly upon the bottom of the cell, but has under it a disk of yielding rubber H. This rubber disk serves a double purpose; that is, it forms a yielding support for the bottom of the porous cup E, and also a kind of a gasket for tightly closing the lower end of the shield K, which will be hereinafter described.

P, Figs. 2 and 5, is a screw bolt made of aluminum, its head being counter-sunk into the carbon disk D' of the carbon element D; the bolt P passes down through the bottom of the porous cup E, the rubber H and the bottom of the case A, and serves to hold the several parts in place, it being provided with a washer P' and screw nut $P^2$ by means of which it may be firmly held in place. The aluminum bolt P also serves as an electrode for the carbon element D, $P^3$ being a binding nut, for holding the conducting wire.

The rod, Fig. 5, is held in place by the washer $M^2$ and screw nut $M^3$, and serves to electrically connect the mercury in the cup M with the binding nuts $M^3$ $M^4$.

I will now describe my device for stopping the action of the battery. This consists of a hollow cylinder, which is closed at the top (see Figs. 3 and 5) and open at the lower end, as shown. The upper end enters through a partition B' (see Fig. 5) that forms a part of the case and is made fast thereto, so that in lifting off the cover of the box the shields K are lifted up with it. The upper ends of the shields are perforated, and the chamber $B^2$ in the cover of the case is filled with mineral wool or some other suitable absorbent, and saturated with some suitable chemical,—like bichromate of potash, for instance,—for the purpose of absorbing the noxious exhalations from the battery solution, and also, by its great affinity for the depolarizing gases, to prevent, in a great measure, the deterioration of the battery when in use.

For supporting the cover B B' of the case and the attached shields K—K, when it is desired to use the battery, I have the following described device: L is a loop or bail made of a strip of metal in the form shown; this strip is pivoted at its ends to the side of the case (see L', Fig. 1), and is connected at $L^3$ by a link $L^2$ to the cover of the case. $L^4$ is a rod, there being one on each side of the case, which is rigidly attached to the cover of the case and extends downward through a bracket N on the side of the case. A clamping thumb-nut N' on the bracket N serves to hold the rod $L^4$ in any desired position; that is, the cover B and the shields may be held above the case so as to allow the battery to work.

The shield K may be made of glass, hard rubber, or glazed earthenware, &c.

I claim—

1. In a battery, a zinc element having a stud of metal projecting centrally from it and adapted to extend downward into a mercury cup: with said mercury cup connected electrically to one of the binding posts of the cell, substantially as described and for the purpose set forth.

2. In a battery, a shield of non-porous material adapted to pass down between the zinc and the carbon element, said shield being perforated at or near its upper end and connected to the cover of the case: with a yielding rubber gasket at the bottom of the cell, substantially as described and for the purpose set forth.

3. In a battery, the combination of the body part of the case A and cells, the walls of which are made integrally with the outer part of the case: with a cover to which are attached shields and which is provided with mechanism for supporting it at any desired height above the body of the battery, substantially as described and for the purpose set forth.

CHARLES J. HUBBELL.

Witnesses:
FRANK G. PARKER,
FRANK G. HATTIE.